July 4, 1967  A. C. WOODEN  3,329,934
DEVICE FOR INDICATING LOSS OF TIRE AIR PRESSURE
Filed Oct. 2, 1964
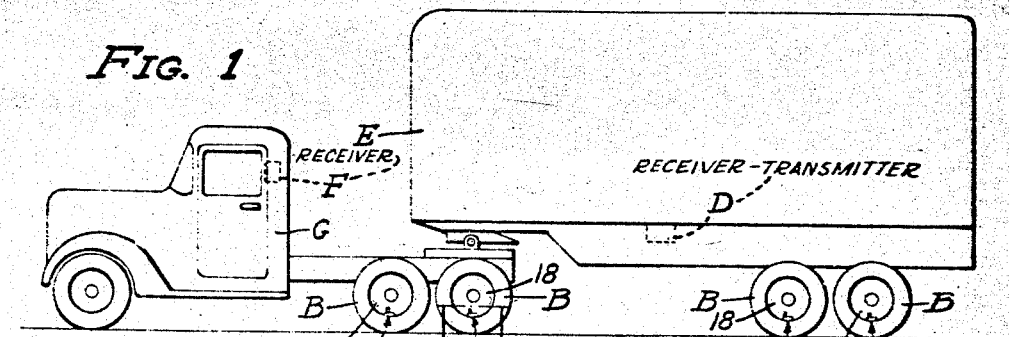
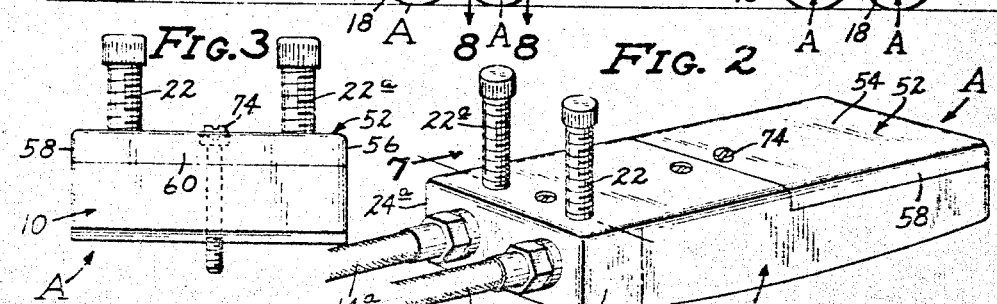
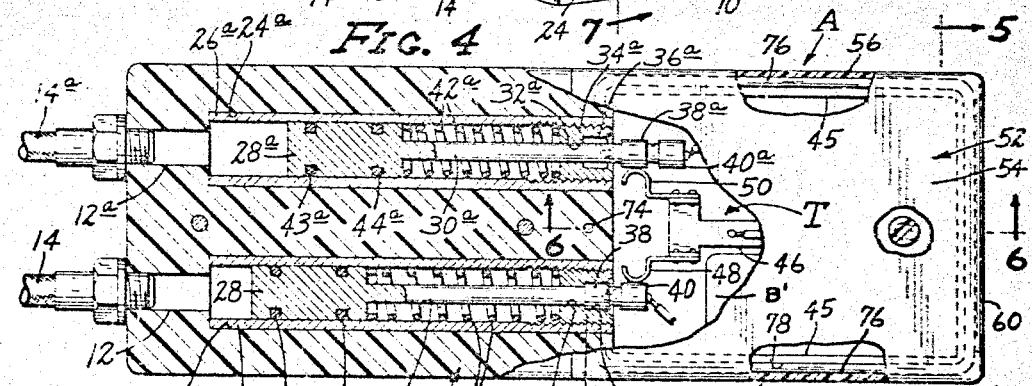
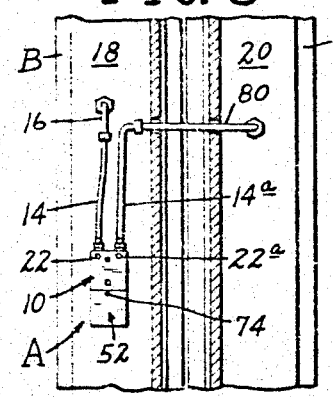
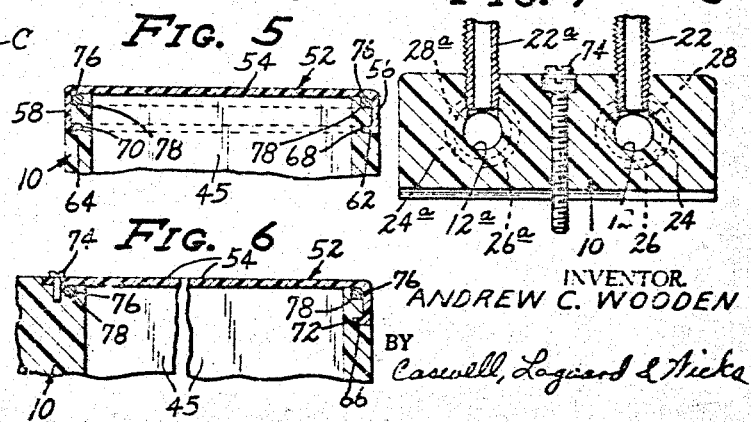
INVENTOR.
ANDREW C. WOODEN
BY Caswell, Loquard & Hicks
ATTORNEYS

United States Patent Office 3,329,934
Patented July 4, 1967

3,329,934
DEVICE FOR INDICATING LOSS OF TIRE AIR PRESSURE
Andrew C. Wooden, Box 237,
Little Falls, Minn. 56345
Filed Oct. 2, 1964, Ser. No. 401,115
4 Claims. (Cl. 340—58)

The present invention relates to an improvement in a device for indicating a loss of air pressure in a pneumatic tire.

When a pneumatic tire is run with the air pressure below normal, excessive wear is caused and if tire pressure falls to nothing, further running completely destroys the tire. As the size of vehicles for overland transportation, such as busses and trucks increased, the size and quality of the pneumatic tires increased and the cost of the same increased considerably. The maintenance of proper tire air pressure materially reduces tire cost.

It is an object of the invention to provide a device mounted on the wheel of the vehicle for indicating a fall off in pressure in a tire, the loss in pressure actuating a transmitter which transmits a radio signal. This signal is picked up by a receiver-transmitter keyed to the same and located in close proximity to the wheels of the vehicle, the receiver-transmitter transmitting a signal to a receiver located in the cab of the vehicle. The receiver of the receiver-transmitter is of low sensitivity so that signals other than those from the transmitter of the wheel unit are not picked up and a low sensitivity receiver can be used because it is mounted on the vehicle with a minimum distance to the wheels as compared with one receiver in the cab of the vehicle. As a result, the tire with the loss in pressure can be repaired before extensive damage can occur.

It will not be here attempted to set forth and indicate all of the various objects and advantages incident to the invention, but other objects and advantages will be referred to in or else will become apparent from that which follows.

The invention will appear more clearly from the following detailed description when taken in connection with the accompanying drawings, showing by way of example a preferred embodiment of the inventive idea wherein like numerals refer to like parts throughout.

In the drawings forming part of this application:

FIGURE 1 is a side elevation of a truck tractor and semi-trailer illustrating the device thereon.

FIGURE 2 is a perspective view of that portion of the unit mounted on the wheel of the vehicle.

FIGURE 3 is a rear end view of the wheel unit.

FIGURE 4 is a plan view of the wheel unit, portions thereof being broken away, other portions being in section.

FIGURE 5 is a section on the line 5—5 of FIGURE 4.

FIGURE 6 is a section on the line 6—6 of FIGURE 4.

FIGURE 7 is a section on the line 7—7 of FIGURE 2.

FIGURE 8 is a view on the line 8—8 of FIGURE 1 showing the installation of the unit on the wheel of the vehicle.

Referring to the drawings in detail, the wheel unit A as part of the device for indicating a loss of tire pressure includes the body member of high impact plastic. The body member 10 has formed therein the air inlet orifice 12 to which is connected the short air line 14 which in turn is connected to the conventional valve stem 16 of the tire B of the outboard wheel rim 18 which is connected to the inboard wheel rim 20 mounting the tire C. Mounted in the body 10 is the inflating stem 22 which carries a conventional valve core and which communicates with the inlet orifice 12. The valve core is removed from stem 16 and operates in stem 22. Leading from and axially disposed to the inlet orifice 12 is the enlarged cylinder portion 24 of the block 10 in which is positioned the metal cylinder sleeve 26 and which forms a cylinder.

The numeral 28 designates a piston which is positioned in the cylinder sleeve 26, and connected to and extending axially from the piston is the extension or rod 30. The outer end of the rod 30 slidably extends through the axial hole 32 of the bushing 34 which is threadedly engaged in the end of the sleeve 26. The hole 32 of the bushing 34 terminates in an enlarged socket portion 36 which receives the insulator 38 mounted on the outer end of the rod 30, the movement of which will be hereinafter described. Also positioned on the extreme outer end of the rod 30 is the contact 40 spaced from the insulator 38.

Further provided is the coil tension spring 42 which is positioned on the rod 30 and held captive between the piston 28 and the bushing 34 thereby urging the piston toward the air inlet hole 12. Sealing engagement of the piston 28 with the cylinder sleeve 26 is made by means of the O-rings 42 and 44 mounted in annular recesses formed in the piston 28. The bushing 34 is formed with holes for a spanner wrench and as the bushing is screwed inwardly the tension on the spring 42 is increased and vice versa. Greater tension on the spring would require less fall off in pressure to cause the piston and rod 30 to move to create a signal in the conventional transmitter T.

The transmitter T is battery operated by means of the battery B' and housed within the recess 45 of body 10 which includes the bar 46 on which is mounted the pair of contactors 48 and 50. Contact of contactor 48 is made between either insulator 38 or contact 40. The contactors 48 and 50 are connected to a conventional circuit not shown and by means of which the transmitter is energized.

Access to the transmitter T is gained through the cover 52 which includes the flat top portion 54 formed with the right angular side walls 56 and 58 and end wall 60. The walls 56, 58 and 60 are formed with the inturned flange portions 62, 64 and 66, respectively, which engage in the grooves 68, 70 and 72, respectively, formed in the body 10. The cover 52 is thus slidably positioned upon the body 10 with the flanges 62, 64 and 66 within the grooves 68, 70 and 72, respectively. The cover 52 is secured in position by means of the screw 74 threadedly engaged in the body 10 through a portion of the cap overlying the body. Sealing engagement between the cap 52 and the body 10 is accomplished by the elongated compressible gasket member 76 positioned in the recess 78 formed in the body 10 spaced from but adjacent the top edge of the recess 45.

The operation of the device is as follows: The tire B is inflated through the inflating stem 22 to the proper pressure say of 110 lbs. This pressure is exerted against the piston 28 thereby forcing the same and the rod 30 rearwardly against the tension of the spring whereby the insulator 38 is placed in contact with contact 48 thereby grounding out the transmitter. The tension of the spring 42 is such that it takes, for example, 110 lbs. of air pressure to maintain the piston 28 in the position with the insulator 38 in contact with the contactor 48 thereby making the transmitter T inoperative as illustrated by the contact 38a, hereinafter described, in contact with contact 50. The spring 42 is constructed so that when the air pressure in the tire B falls off say to 85 lbs., the piston moves toward orifice 12 to a position where contact 40 of rod 30 contacts contactor 48 of the bar 46 of the transmitter and energizes the transmitter T which transmits a signal to the conventional receiver-transmitter D mounted on the semi-trailer E. The receiver-transmitter D transmits the signal to the conventional receiver F tuned to the signal in the cab of the tractor G. The signal warns the driver in the cab that a tire connected to one or more of the units A has less than a minimum air pressure. When the tire is repaired or replaced, the same is inflated, and the piston 28 returned to the position shown for piston 28a hereinafter described with the insulator 38 in contact with contactor 48 of the transmitter T.

The signal given off by the transmitter T is one of low output and as a result the pickup of the same is by the receiver-transmitter D located as close as possible and as central to the wheels of the trailer E and the rear wheels of the tractor G. The transmitter T gives off a low output signal so that D picks up only the signal of T and not other extraneous signals which might activate the transmitter of D, and because of this the receiver-transmitter D is provided and which allows a positioning as closely as possible to the wheels of the semi-trailer E and the rear wheels of the tractor G.

A fall off in air pressure in tire C on dual rim 20 is indicated by means of identical construction in the same body 10, the body 10 being mounted on the outboard wheel rim 18. The identical parts are given identical numbers accompanied in each instance by the letter a. Short air line 14a is connected to the valve stem 80 of the tire C. Thus, the unit A serves both tires B and C. A unit A is used for each set of dual wheels. A signal transmitted by the transmitter of any of the units A of FIGURE 1, for example, is picked up and transmitted by receiver-transmitter D and transmitted to receiver F in the cab of tractor G. The driver ascertains by a simple visual or tapping check which tire has had a fall off in pressure.

The invention is not to be understood as restricted to the details set forth since these may be modified within the scope of the appended claims without departing from the spirit and scope of the invention.

Having thus described the invention what is claimed as new and desired to be secured by Letters Patent is:

1. In a device for indicating a loss in tire air pressure on a vehicle comprising:
   (a) a body member having
   (b) an air inlet orifice leading to
   (c) a cylinder formed therein,
   (d) means for connecting said air inlet orifice to the valve stem of a tire,
   (e) a piston mounted in said cylinder and having
   (f) a rod extending axially therefrom,
   (g) means for introducing air into said air inlet orifice to actuate said piston and inflate a tire through said connecting means,
   (h) a bushing adjustably mounted in said cylinder and through which said rod freely extends,
   (i) an insulator member located on said rod,
   (j) a contact member located on said rod,
   (k) a signal transmitter mounted in said body member having a contactor member thereon,
   (l) a coil spring mounted on said rod between said piston and said bushing urging said piston and rod thereon toward said air inlet orifice to bring said contact in contact with said contactor to thereby energize said transmitter upon a decrease in pressure on said piston, said transmitter being deenergized as a result of said insulator on said rod contacting said contactor due to an increase in air pressure upon said piston, and
   (m) means for mounting said body member on the wheel of a vehicle.

2. In a device for indicating a loss in tire pressure on a vehicle comprising:
   (a) a body member having
   (b) an air inlet orifice leading to
   (c) a cylinder formed therein,
   (d) means for connecting said air inlet orifice to the valve stem of a tire,
   (e) a piston mounted in said cylinder,
   (f) means for introducing air into said air inlet orifice to actuate said piston and inflate a tire through said connecting means,
   (g) a signal transmitter mounted in said body member,
   (h) spring means urging said piston in one direction in said cylinder,
   (i) said piston having an extension portion extending axially of the piston within said body member,
   (j) means carried by said extension portion for energizing said transmitter when said piston is moved in one direction by said spring means and a lowering of pressure on said piston,
   (k) means carried by said extension portion for deenergizing said transmitter when said piston is moved in the opposite direction by an increase in pressure and against the action of said spring means, and
   (l) means for mounting said body member on the wheel of a vehicle.

3. In a device for indicating a loss in tire air pressure comprising in combination:
   (a) a body member having
   (b) an air inlet leading to
   (c) a chamber formed therein,
   (d) means for connecting said air inlet to the valve stem of a tire,
   (e) means for introducing air into said chamber to create a pressure therein and inflate a tire through said connecting means,
   (f) a signal transmitter mounted in said body member,
   (g) a piston in said chamber having means carried by one end thereof for energizing said signal transmitter upon a decrease of pressure in said chamber,
   (h) a piston in said chamber having means carried by one end thereof for deenergizing said signal transmitter upon an increase in pressure in said chamber,
   (i) a receiver signal transmitter for location on a vehicle on which said signal transmitter is mounted in close proximity to said body member for receiving a signal from said signal transmitter and transmitting said signal, and
   (j) a receiver for location in the cab of the vehicle for receiving the signal transmitted from said receiver-transmitter.

4. In a device for indicating a loss in tire air pressure on a vehicle comprising:
   (a) a body member having
   (b) an air inlet orifice leading to
   (c) a cylinder formed therein,
   (d) means for connecting said air inlet orifice to the valve stem of a tire,
   (e) a piston mounted in said cylinder and having
   (f) a rod extending axially therefrom,
   (g) means for introducing air into said air inlet orifice to actuate said piston and inflate a tire through said connecting means,
   (h) an insulator member located on said rod,
   (i) a contact member located on said rod,
   (j) a signal transmitter mounted in said body member having a contactor member thereon,
   (k) means mounted on said rod urging said piston and rod thereon toward said air inlet orifice to bring said contact in contact with said contactor to thereby energize said transmitter upon a decrease in pressure on said piston, said transmitter being deenergized as a result of said insulator on said rod contacting said contactor due to an increase in air pressure upon said piston, and
   (l) means for mounting said body member on the wheel of a vehicle.

References Cited

UNITED STATES PATENTS 2,966,658  12/1960  O'Neill _____ 340—58
3,215,978  11/1965  Brown et al. _____ 340—58

NEIL C. READ, *Primary Examiner.*

A. H. WARING, *Assistant Examiner.*